(12) United States Patent
Adler et al.

(10) Patent No.: US 10,643,185 B2
(45) Date of Patent: May 5, 2020

(54) SUGGESTED LOCATIONS FOR CALENDAR EVENTS

(71) Applicant: Apple Inc., Cupertino, CA (US)

(72) Inventors: Scott Adler, Saratoga, CA (US); Daniel C. Gross, San Francisco, CA (US); Lili Cao, Sunnyvale, CA (US); Samuel C. Cates, Los Gatos, CA (US); Hyo Jeong Shin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 15/268,952

(22) Filed: Sep. 19, 2016

(65) Prior Publication Data

US 2017/0357904 A1    Dec. 14, 2017

Related U.S. Application Data

(60) Provisional application No. 62/348,754, filed on Jun. 10, 2016.

(51) Int. Cl.
 *G06Q 10/10* (2012.01)
 *G06N 20/10* (2019.01)

(52) U.S. Cl.
 CPC .......... *G06Q 10/109* (2013.01); *G06N 20/10* (2019.01)

(58) Field of Classification Search
 CPC .... G06F 16/24578; G06N 5/04; G06N 7/005; G06N 20/10; G06Q 10/109
 See application file for complete search history.

(56) References Cited

U.S. PATENT DOCUMENTS

| | | | |
|---|---|---|---|
| 6,889,138 B1 | 5/2005 | Krull et al. | |
| 8,090,383 B1 | 1/2012 | Emigh et al. | |
| 8,385,944 B1 | 2/2013 | Nelissen | |
| 8,990,107 B2 | 3/2015 | Liang et al. | |
| 9,076,009 B2 | 7/2015 | Sathish et al. | |
| 9,243,911 B2 | 1/2016 | Coughlin et al. | |
| 2002/0161587 A1 | 10/2002 | Pitts | |
| 2003/0148771 A1 | 8/2003 | de Verteuil | |
| 2005/0073443 A1* | 4/2005 | Sheha | G01C 21/36 340/995.1 |

(Continued)

FOREIGN PATENT DOCUMENTS

| | | |
|---|---|---|
| CN | 1486576 | 3/2004 |
| CN | 101438580 | 5/2009 |

(Continued)

OTHER PUBLICATIONS

Fawaz et al., "Anatomization and Protection of Mobile Apps Location Privacy Threats", Aug. 12-14, 2015, Proceedings of the 24th USENIX Security Symposium, pp. 753-768 (Year: 2015).*

(Continued)

*Primary Examiner* — Hal Schnee
*Assistant Examiner* — Brent Johnston Hoover
(74) *Attorney, Agent, or Firm* — Jaffery Watson Mendonsa & Hamilton LLP

(57) ABSTRACT

In an example method, a mobile device receives a first calendar item associated with a first event. The first calendar item includes a first text string. The mobile device determines a correlation between the first text string and one or more locations associated with one or more second events. The mobile device determines a suggested location for the first event based on the correlation.

30 Claims, 6 Drawing Sheets

(56) References Cited

U.S. PATENT DOCUMENTS

| | | |
|---|---|---|
| 2007/0016553 A1 | 1/2007 | Dumals |
| 2008/0001276 A1 | 1/2008 | Lee et al. |
| 2008/0012761 A1 | 1/2008 | Derrick et al. |
| 2009/0196267 A1 | 8/2009 | Walker, Sr. |
| 2010/0304756 A1 | 12/2010 | Yang |
| 2011/0046881 A1 | 2/2011 | Karaoguz |
| 2011/0137834 A1 | 6/2011 | Ide et al. |
| 2011/0184768 A1* | 7/2011 | Norton ............... G06Q 10/02 705/5 |
| 2011/0195727 A1 | 8/2011 | Proulx et al. |
| 2011/0219328 A1* | 9/2011 | Ilvessalmi ........... G06Q 10/109 715/780 |
| 2012/0052871 A1 | 3/2012 | Cochran et al. |
| 2012/0058782 A1 | 3/2012 | Li |
| 2012/0088525 A1 | 4/2012 | Kurokawa et al. |
| 2012/0108259 A1 | 5/2012 | Weiss |
| 2012/0149394 A1 | 6/2012 | Singh et al. |
| 2012/0149415 A1 | 6/2012 | Valaee et al. |
| 2013/0014040 A1* | 1/2013 | Jagannathan ......... G06Q 50/01 715/765 |
| 2013/0066548 A1 | 3/2013 | Gruen et al. |
| 2013/0159234 A1 | 6/2013 | Xing et al. |
| 2013/0252633 A1 | 9/2013 | Liang et al. |
| 2013/0252638 A1 | 9/2013 | Yang et al. |
| 2013/0315042 A1* | 11/2013 | Kindel ................. G04G 9/0076 368/10 |
| 2014/0058778 A1 | 2/2014 | Mclarty et al. |
| 2014/0094199 A1 | 4/2014 | Palanki et al. |
| 2014/0099921 A1 | 4/2014 | Weiss |
| 2014/0141808 A1 | 5/2014 | Deng |
| 2014/0162693 A1 | 6/2014 | Wachter et al. |
| 2014/0164358 A1* | 6/2014 | Benzatti ............. G06Q 10/109 707/722 |
| 2014/0171013 A1 | 6/2014 | Varoglu et al. |
| 2014/0229099 A1 | 8/2014 | Garrett et al. |
| 2015/0058057 A1* | 2/2015 | Egan .................. G06Q 10/1095 705/7.19 |
| 2015/0087264 A1 | 3/2015 | Goyal |
| 2015/0199380 A1* | 7/2015 | Avramova ............. G06F 16/29 707/738 |
| 2015/0201307 A1 | 7/2015 | Dishneau |
| 2015/0237470 A1 | 8/2015 | Mayor |
| 2015/0304437 A1 | 10/2015 | Vaccari et al. |
| 2015/0350828 A1 | 12/2015 | Marti et al. |
| 2015/0350841 A1 | 12/2015 | Dal Santo et al. |
| 2015/0350842 A1 | 12/2015 | Huang et al. |
| 2015/0350843 A1 | 12/2015 | Jensen et al. |
| 2016/0003637 A1 | 1/2016 | Andersen |

FOREIGN PATENT DOCUMENTS

| | | |
|---|---|---|
| CN | 104067305 | 9/2014 |
| WO | WO 2013/024276 | 2/2013 |

OTHER PUBLICATIONS

Zheng et al., "Collaborative Location and Activity Recommendations with GPS History Data", Apr. 26-30, 2010, WWW 2010, pp. 1-10 (Year: 2010).*

Korean Intellectual Property Office Notice of Preliminary Rejection for Application No. 10-2016-7021591, dated May 22, 2017, 13 pages.

Invitation to Pay Additional Fees and, Where Applicable, Protest Fees, International Application No. PCT/US2015/033049, dated Aug. 12, 2015, 6 pages.

International Search Report and Written Opinion in International Application No. PCT/US2015/033049, dated Dec. 1, 2015, 23 pages.

International Search Report in International Application No. PCT/US2015/015014, dated May 11, 2015, 14 pages.

Chinese Office Action in Chinese Application No. 201580028839, dated Mar. 25, 2019, 10 pages with English Translation.

* cited by examiner

SUGGESTED LOCATIONS FOR CALENDAR EVENTS

CROSS REFERENCE TO RELATED APPLICATIONS

This application is a non-provisional of and claims priority to U.S. Provisional Patent Application No. 62/348,754, filed on Jun. 10, 2016, the entire contents of which are hereby incorporated by reference.

TECHNICAL FIELD

The disclosure relates generally to managing data for an electronic calendar.

BACKGROUND

In general, a calendar is a system of organizing time for social, commercial, administrative, or other purposes. As an example, a calendar can visually represent one or more periods of time (e.g., hours, days, months, or years), and depict one or more events scheduled during those periods of time. This allows users to view events scheduled to occur in the past, present, and/or future, and organize their activities accordingly.

In many cases, an electronic device (e.g., a computer, mobile or wearable device) can include a calendar application that enables a user to manage a calendar electronically. As an example, a user can add one or more events to an electronic calendar and view or modify the events to manage the user's schedule.

SUMMARY

Systems, methods, devices and non-transitory, computer-readable mediums are disclosed for managing data with respect to an electronic calendar.

In general, in an aspect, a computer-implemented method includes receiving, at a mobile device, a first calendar item associated with a first event. The first calendar item includes a first text string. The method also includes determining, at the mobile device, a correlation between the first text string and one or more locations associated with one or more second events. The method also includes determining, at the mobile device, a suggested location for the first event based on the correlation.

Implementations of this aspect can include one or more of the following features.

In some implementations, the text string can be a title of the calendar item.

In some implementations, the text string can be a colloquial name of a location.

In some implementations, the correlation can be determined by receiving, at the mobile device, one or more second calendar items associated with the one or more second events, wherein the second calendar items each comprise the first text string, determining one or more significant locations associated with the second events, and determining the correlation based on the second events and the significant locations.

In some implementations, the method can further include generating a histogram indicating a frequency in which the first text string is associated with each of the significant locations.

In some implementations, determining the suggested location can include selecting the suggested location from among the significant locations. The suggested location can be a most frequently occurring significant location with respect to the first text string.

In some implementations, the method can further include displaying, to a user of the mobile device, the suggested location, receiving, at the mobile device, an instruction from the user to modify the suggested location, and responsive to receiving the instruction to modify the suggested location, displaying, to the user, one or more points of interest near the suggested location. The suggested location can be a geographical region. The one or more points of interest can be within the geographical region.

In some implementations, the method can further include receiving, from the user, an input from the user selecting one of the one or more points of interest, and responsive to receiving the input selecting one of the one or more points of interest, updating the calendar item to include the selected point of interest.

In some implementations, the method can further include displaying, to a user of the mobile device, the suggested location, receiving, at the mobile device, an input from the user confirming the suggested location, and responsive to receiving the input confirming the suggested location, adding the suggested location to the first calendar item as a confirmed location for the first event.

In some implementations, the method can further include receiving, at the mobile device, an instruction from a user to add the first calendar item. The instruction can include entry of at least a portion of the first text string by the user. The method can further include, responsive to receiving the instruction to add the first calendar item, automatically displaying the suggested location for the first event to the user.

Other implementations are directed to systems, devices and non-transitory, computer-readable mediums.

Particular implementations provide at least the following advantages. One or more of the implementations described herein can be used to determine suggested locations for the events on an electronic calendar. These suggested locations can be automatically determined by the system, and automatically associated with the events managed by a calendar application, such that the user does not need to manually input a location for each event. In some cases, the system can automatically suggest a location for a calendar event based on a user's historical behavior with respect to previously scheduled calendar events. Thus, the system can suggest personalized location suggestions for calendar events that more accurately reflect the habits and preferences of the user. Accordingly, the user can enter information regarding calendar events more quickly and efficiently.

The implementations described herein can also provide various technical benefits. As an example, implementations of the system enable a user to input location information regarding events more quickly and with fewer manual inputs. Thus, the user's devices can remain in a lower power state for a longer period of time, thereby consuming fewer resources. As a result, the mobile computing device can operate more efficiently.

As another example, implementations of the system can automatically modify suggested locations for multiple events, without requiring a user to manually modify each individual event location. As above, this enables the user's devices to remain in a lower power state for a longer period of time, thereby consuming fewer resources. Similarly, the mobile computing device can thus operate more efficiently.

Details of one or more implementations are set forth in the accompanying drawings and the description below. Other features, aspects, and potential advantages will be apparent from the description and drawings, and from the claims.

DESCRIPTION

Overview

Figure 1:
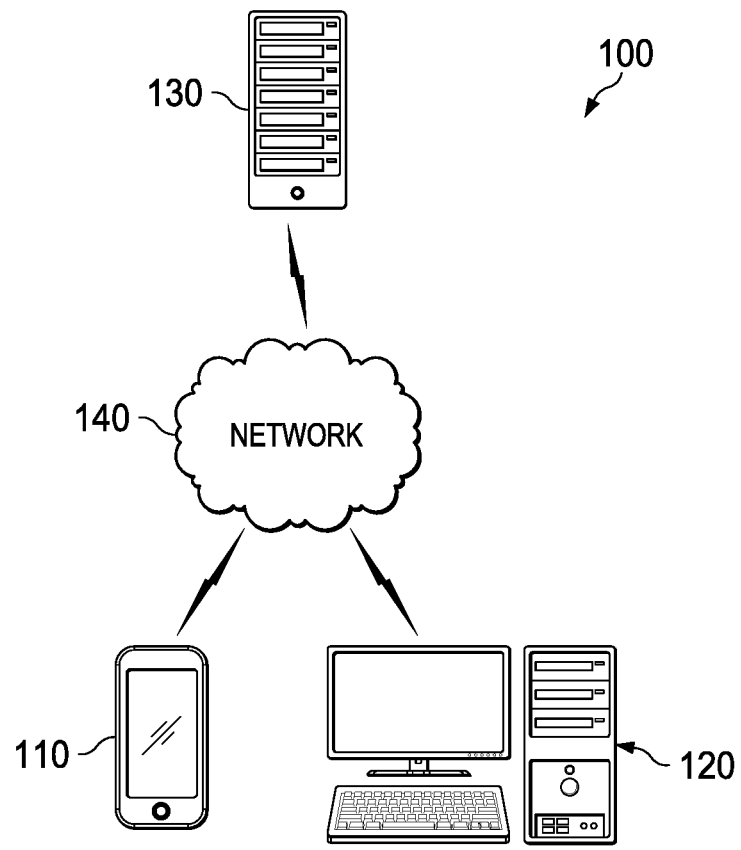
FIG. 1 is a block diagram of an example system for managing data with respect to an electronic calendar.

FIG. 1 is a block diagram of an example system 100 for managing data with respect to an electronic calendar. A user can interact with the system 100 to input information regarding one or more upcoming events. In response, the system 100 can automatically suggest a location for each of those events, such that the user does not need to manually input a location. The user's inputted information and the automatically suggested location of the event are retained in the electronic calendar for future reference (e.g., as an "event" in the electronic calendar). The system 100 can automatically suggest a location based on a correlation between information regarding an event scheduled to occur in the future and historical information regarding one or more events that have occurred in the past (e.g., a user's historical behavior with respect to previously scheduled events). Thus, the system 100 can provide personalized location suggestions for calendar events that more accurately reflect the habits and preferences of the user.

The system 100 includes a mobile computing device 110, a computing device 120, a server computing device 130, and a network 140. Although a single mobile computing device 110, computing device 120, server computing device 130, and network 140 are shown in FIG. 1, it is understood that the system 100 can include any number of each.

The mobile computing device 110 can be any portable electronic device that is used by a user to view, process, transmit and receive data. Examples of a mobile computing device 110 include cellular phones, smartphones, wearable devices (e.g., smart watches, smart glasses), tablets, personal data assistants, notebook computers, and other portable computing devices capable of transmitting and receiving data via the network 140.

The computing device 120 and the server computing device 130 can each be any electronic device that is used by a user to view, process, transmit and receive data. The computing devices 120 and 130 can be portable or non-portable devices. Examples of the computing devices 120 and 130 include computers (such as desktop computers, notebook computers, server systems, etc.), mobile computing devices, and other computing devices capable of transmitting and receiving data via network 140.

The network 140 can be any communications network through which data can be transferred and shared. For example, the network 140 can be a local area network (LAN) or a wide-area network (WAN), such as the Internet. The network 140 can be implemented using various networking interfaces, for instance wireless networking interfaces (such as Wi-Fi, Bluetooth™, or infrared) or wired networking interfaces (such as Ethernet or serial connections). The network 140 also can include combinations of more than one network, and can be implemented using one or more networking interfaces.

In an example usage of the system 100, a user interacts one or more of the mobile computing device 110, the computing device 120, and the server computing device 130 to access a calendar application. The calendar application maintains one or more electronic calendars, each containing information regarding the user's events (e.g., events scheduled to occur in the past, present, and/or future), and presents information regarding those events to the user (e.g., through a display device communicatively coupled to the mobile computing device 110, the computing device 120, and/or the server computing device 130). Example calendar applications include the Calendar application developed by Apple Inc., Cupertino, Calif., USA.

Information regarding each calendar event can include, for example, a title or name of the event, a location of the event (e.g., an address, geographical coordinates such as latitude and longitude, or other such information), a scheduled time and day for the event, a description of the event (e.g., a narrative, an explanation, or other information pertaining to the event), the invitees or anticipated participants of the event, and so forth. As an example, a scheduled poker game between friends can include a title or name of the event (e.g., the text string "Poker Night"), a location for the event (e.g., the text string "123 Main Street"), a scheduled time and day for the event (e.g., July 1 at 8 PM), a description of the event (e.g., the text string "We're playing Omaha hold'em tonight!"), and the invitees or anticipated participants (e.g., "Anne," "Bob," "Charlie," and "Dianne"). This information can be stored in an electronic format, and visually presented to the user (e.g., in the form of text, images, tables, charts, lists, or a combination thereof) as a part of the electronic calendar.

In some cases, a user can modify information regarding a calendar event. For example, a user can interact with the calendar application to revise a particular event's information (e.g., by changing the title or name of the event, the scheduled time and day, the description, and/or the invitees or participants of the event). As another example, a user can add additional events to the electronic calendar. As another example, a user can delete existing events from the electronic calendar.

The electronic calendar can be stored on one or more of the mobile computing device 110, the computing device 120, and the server computing device 130. For example, in some cases, a copy of the electronic calendar can be stored on each of the mobile computing device 110, the computing device 120, and the server computing device 130. To maintain data consistency, when the electronic calendar is modified on one device (e.g., the mobile computing device 110), the device can communicate (e.g., synchronize) those changes with each of the other devices using a network-based syncing service. In this manner, the calendar modifications are propagated to the other devices to maintain current copies of the electronic calendar.

As another example, in some cases, a copy of the electronic calendar can be stored on a subset of the devices (e.g., the server computing device 130), and that copy can be accessed by one or more of the other devices (e.g., the mobile computing device 110 and the computing device 120). In this manner, the system can maintain a limited number of copies of the electronic calendar in a relatively centralized location, while still permitting multiple devices to view and modify the electronic calendar.

As another example, the electronic calendar need not be shared between devices at all, and each device can maintain a separate and independent electronic calendar.

As described herein, the system 100 can automatically suggest a location for one or more calendar events, such that the user does not need to manually input a location for those calendar events. In some cases, the system 100 can automatically suggest a location based on a correlation between information regarding an event scheduled to occur in the future and historical information regarding one or more previously occurring events (e.g., a user's historical behavior with respect to previously scheduled events). Thus, the system 100 can provide personalized suggestions that more accurately reflect the habits and preferences of the user.

Figure 2:
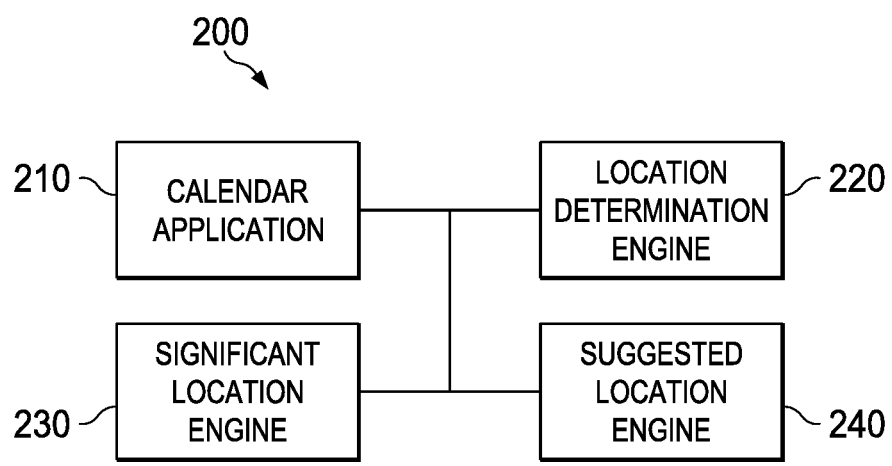
FIG. 2 is a block diagram of an example architecture for managing data with respect to an electronic calendar.

Personalized location suggestions can be provided using various computer architectures implemented on one or more mobile computing devices 110, computing devices 120, and/or server computing devices 130. To illustrate, an example architecture 200 for providing personalized location suggestions is shown in FIG. 2. The example architecture 200 includes a calendar application 210, a location determination engine 220, a significant location engine 230, and a suggested location engine 240. In some cases, the location determination engine 220, the significant location engine 230, and/or the suggested location engine 240 can be implemented as a part of the calendar application 210 (e.g., as a sub-module or sub-component of the calendar application 210).

The calendar application 210 maintains one or more electronic calendars, each containing information regarding a user's events (e.g., events scheduled to occur in the past, present, and/or future). As an example, the calendar application 210 can store a data record for each event of an electronic calendar. Each data record can include, for instance, a title or name of the event, a location of the event, a scheduled time and day for the event, a description of the event, the invitees or anticipated participants of the event, and so forth.

The calendar application 210 can also present information regarding one or more events to a user. For example, the calendar application can present, for each event, a title or name of the event, a location of the event, a scheduled time and day for the event, a description of the event, and/or the invitees or anticipated participants of the event. The information can be presented, for instance, through a display device communicatively coupled to a mobile computing device 110, a computing device 120, and/or a server computing device 130). In some cases, the electronic calendar can be visually presented in the form of one or more tables, charts, and/or lists (or a combination thereof).

The calendar application 210 can also enable a user to modify information regarding an event. For example, a user can interact with the calendar application 210 to revise a particular event's information (e.g., by changing the title or name of the event, the scheduled time and day, the description, and/or the invitees or participants of the event). As another example, a user can interact with the calendar application 210 to add additional events to the electronic calendar. As another example, a user can interact with the calendar application 210 to delete existing events from the electronic calendar.

The location determination engine 220 determines the location of one or more electronic devices. For example, the location determination engine 220 can be implemented on a mobile computing device (e.g., the mobile computing device 110), and determine the location of the mobile computing device 110 continuously, periodically, or intermittently. In some cases, the location determination engine 220 can determine a device's location based on information obtained from a global navigation satellite system (GNSS) (e.g., Global Positioning System (GPS)), and/or through wireless signal triangulation (e.g., triangulation of Wi-Fi or cellular signals emitted from multiple signal sources), wireless signal trilateration, wireless signal multilateration (MLAT), and/or other techniques.

In some cases, the location determination engine 220 can determine the specific location of the mobile computing device 110. As an example, the location determination engine 220 can determine the coordinates of the mobile computing device 110 according to a geographic coordinate system (e.g., latitude and longitude). In some cases, the location determination engine 220 can determine a generalized location of the mobile computing device 110. As an example, the location determination engine 220 can continuously, periodically, and/or intermittently determine a geographical area or region within which the mobile computing device is located (e.g., a circular, polygonal, or arbitrary region), or a mailing or postal address associated with the location.

The significant location engine 230 determines a "significant location" of the mobile computing device 110. A significant location is a location that is determined to be relatively important to a user of a mobile computing device 110, or be of particular relevance to the user. This can include, for example, a location that the user of the mobile computing device 110 has visited multiple times in the past, a location that user of the mobile computing device 110 has visited for a lengthy time in the past, and/or a location that the user of the mobile computing device 110 is likely to visit in the future. The significant location engine 230 can determine significant locations based on information obtained from the location determination engine 220. As an example, the mobile device can determine that a geographic location is a significant location based on how long the user of the mobile computing device 110 had dwelled at the geographic location. As another example, the significant location engine 230 can determine that a geographic location is a significant location based on how many times the user of the mobile computing device 110 had visited the geographic location in the past (e.g., visited more than a threshold number of times), and/or the frequency of those visits within a particular period of time. In some case, each significant location can represent a collection or cluster of individual locations.

Additional information regarding significant locations can be found in U.S. application. Ser. No. 14/502,464, filed Sep. 30, 2014 and entitled "Determining a Size of a Significant Location," the disclosure of which is hereby incorporated by reference in its entirety.

In some cases, the calendar application 210 can store historical location information regarding each of the events. For example, while an event on an electronic calendar is in progress, the calendar application 210 can determine the location of the mobile computing device 110 (e.g., a specific location and/or a significant location of the mobile computing device 110), and record that location or significant location alongside the other event information. Thus, the calendar application 210 can store both the anticipated location of the event (e.g., as inputted prior to the occurrence of the event), as well as the specific location and/or significant location of the mobile computing device during the event.

The suggested location engine 240 determines one or more suggested locations for the events of the calendar application 210. These suggestions can be automatically determined by the suggested location engine 240 and automatically associated with the events managed by the calendar application 210, such that the user does not need to manually input a location for each event. In some cases, the suggestion location engine 240 can automatically suggest a location based on a user's historical behavior with respect to previously scheduled events. Thus, the suggested location engine 240 can suggest personalized location suggestions that more accurately reflect the habits and preferences of the user.

In some cases, the suggested location engine 240 can suggest specific locations (e.g., locations determined by the location determination engine 220). In some cases, the suggested location engine 240 can suggest significant locations (e.g., significant locations determined by the significant location engine 230). In some cases, the suggested location engine 240 can suggest both specific locations and significant locations.

The suggested location engine 240 can determine a suggested location in various ways. As an example, in some cases, suggested location engine 240 can obtain information regarding an event scheduled to occur in the future and managed by the calendar application 210. The suggested location engine 240 can determine whether similar events have occurred in the past (e.g., by identifying previously occurring events managed by the calendar application 210 having an identical or similar title, name, description, anticipated participants or invitees, scheduled time or day, or a combination thereof). If one or more similar events have occurred in the past, the suggested location engine 240 determines the historical location of the mobile computing device during those similar events (e.g., a specific location or a significant location associated with those events). Based on the historical locations, the suggested location engine 240 determines a suggested location for the event scheduled to occur in the future. This suggested location can be presented to the user and/or stored with information regarding this event by the calendar application 210.

To illustrate, a user interacts with the calendar application 210 to add an event scheduled to occur in the future to the user's electronic calendar. The user enters information regarding the event, including the title or name of the event (e.g., the text string "Manicure") and the date and time of the event (e.g., May 6 at 11:15 AM). However, in this example, the user does not manually input the location of the event. Instead, the calendar application 210 transmits information regarding the event to the suggested location engine 240 (e.g., by transmitting the title and description of the event to the suggested location engine 240). Based on this information, the suggested location engine 240 determines whether any similar events have occurred in the past (e.g., previously occurring events having identical or similar information, such as previously occurring events having the title "Manicure"). If so, the suggested location engine 240 accesses the historical locations of the mobile computing device during each of those similar events (e.g., the historical location of the mobile computing device during each of the previous "Manicure" events). Based on the historical location information, the suggested location engine 240 suggests one of the historical locations as the suggested location of the event scheduled to occur in the future. Thus, the user is automatically presented with suggested locations based on her historical behavior with respect to previous "Manicure" events.

In some cases, when determining whether any similar events have occurred in the past, the suggested location engine 240 can consider only the previously occurring events that are likely to have been attended by the user. For example, in some cases, a calendar application 210 allows a user to "accept," "decline," or tentatively accept (e.g., "maybe") each event on his calendar. Thus, in some cases, the suggested location engine 240 can consider only the previously occurring events that the user has "accepted" when determining whether any similar events have occurred in the past. This increases the likelihood that the user previously attended the event, and improves the accuracy of the suggestion locations for similar events that occur in the future.

In some cases, the most frequently occurring historical location can be selected as the suggested location (e.g., the most frequently occurring specific location or significant location associated with the particular title, name, description, anticipated participants or invitees, scheduled time or day in question). For example, if the user's mobile computing device was at a Location A five times, at a Location B three times, and at a Location C one time during events entitled "Manicure," the suggested location engine 240 can suggest Location A as the suggested location (as it is associated with 56% of the previous "Manicure" events).

In some cases, the suggested location engine 240 can suggest a location only if one of the historical locations meets or exceeds a particular threshold percentage. For example, the suggested location engine 240 can suggest a location only if one of the historical locations exceeds 60% of the total number of occurrences for similar events. Thus, if the user's mobile computing device was at a Location A five times, at a Location B three times, and at a Location C one time during events entitled "Manicure," the suggested location engine 240 might not suggest any location, as none of the locations exceed 60%. This can be beneficial, for example, in reducing the number of lower quality suggestions that are presented to the user. Although a 60% threshold is described, other thresholds are possible (e.g., 20%, 40%, 80%, or any other threshold percentage).

Although frequency of occurrence and the percentage of occurrence are described as criteria above, this is merely an illustrative example. Other criteria are also possible, depending on the implementation. For example, in some cases, a confidence or likelihood score can be generated for each historical location with respect to a particular title or name of an event, description of an event, anticipated participants or invitees for the event, scheduled time or day of the event, other event information, or a combination thereof. In some cases, the confidence or likelihood score can be generated based on a user's feedback (e.g., decreasing a likelihood score for a location if the user rejected it as a suggestion, increasing the likelihood score for a location if the user accepted it as a suggestion, or assigning a relatively high likelihood score for a location if the user manually inputted the location while editing a suggestion).

In some cases, a confidence or likelihood score can be determined based on a joint likelihood determination with respect to two or more events. For example, in some cases, if two events are occurring close in time, it may be more likely that the events are occurring relatively close in distance to each other, rather than occurring relatively distant from each other. Thus, if two events are occurring close in time, when determining a suggested location for the latter event, the likelihood score of a particular location may be reduced if it is relatively distant from the location of the earlier event. Similarly, if two events are occurring close in time, when determining a suggested location for the earlier event, the likelihood score of a particular location may be increased if it is relatively close to the location of latter event. Likewise, a confidence or likelihood score can be determined based on a joint likelihood determination with respect to three or more events (e.g., three, four, five, or more events that are collectively close in time).

Figure 3:
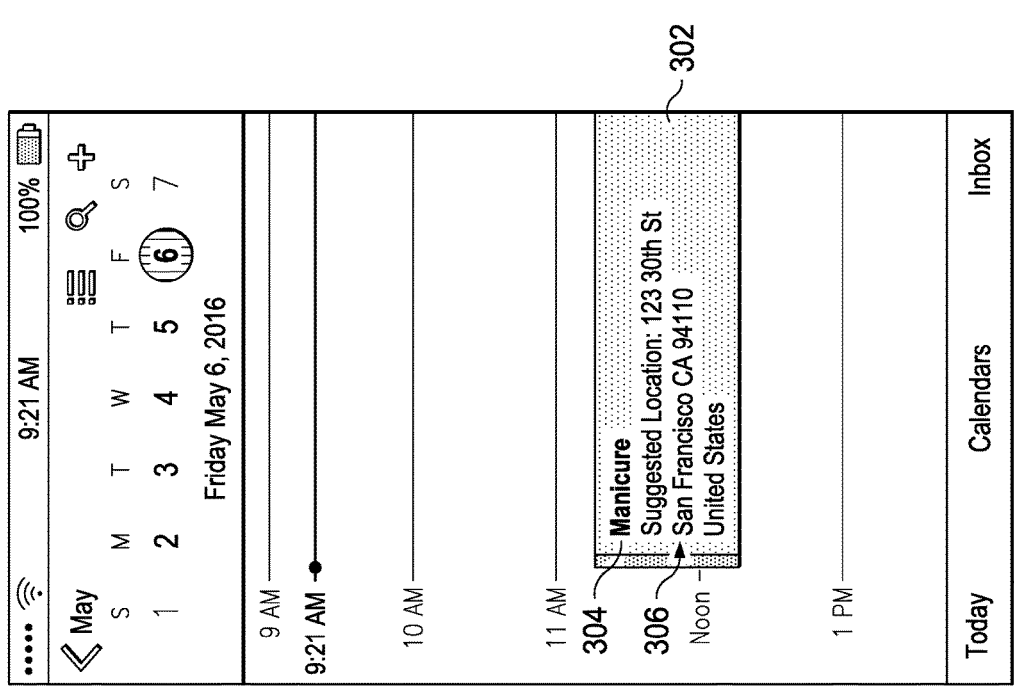
FIG. 3 is a diagram of an example user interface for representing information regarding an event.

FIG. 3 shows an example user interface 300 for presenting information regarding an event. In this example, the user interface 300 visually depicts a period of time during the day, and an event 302 occurring during that period of time. As shown in FIG. 3, the user interface 300 presents the title 304 of the event 302, alongside a suggested location 306 of the event 302. The suggested location 306 is labeled accordingly (e.g., using the label "Suggested Location"), such that the user is aware that it was automatically suggested by the suggested location engine 240, and not manually inputted by the user.

In the foregoing examples, the suggested location engine 240 determines whether similar events have occurred in the past by identifying previously occurring events having the same title or name. However, other techniques also can be used to identify similar events. For instance, in some cases, the suggested location engine 240 can identify similar events as having a similar, but not necessarily identical title or name. As an example, the suggested location engine 240 can identify previously occurring events using "fuzzy" matching techniques (e.g., a Levenshtein distance comparison) to account for typographical errors, minor variations in title or name, and so forth.

Further, in some cases, the suggested location engine 240 can determine whether similar events have occurred in the past by identifying previously occurring events having an identical or otherwise similar description. In some cases, the suggested location engine 240 can consider both the title and the description of the event when identifying similar previously occurring events.

Further, in some cases, the suggested location engine 240 can determine whether similar events have occurred in the past by identifying previously occurring events having an identical or otherwise similar title, name, description, anticipated participants or invitees, scheduled time or day, or a combination thereof.

In some cases, the suggested location engine 240 can maintain historical information on an event-by-event and/or a calendar-by-calendar basis. The suggested location engine 240 can receive information regarding the event and information identifying the particular calendar to which the event is assigned (e.g., from the calendar application 210). In response, the suggested location engine 240 can determine a suggested location specific to the particular event and the identified calendar.

As an illustrative example, a user can manage two separate calendars using a calendar application 210 (e.g., "Work" and "Personal"), and separately schedule events on each of these calendars. When the user adds a new event to the "Personal" calendar (e.g., an event with the user's friends entitled "Bar Night"), the suggested location engine 240 determines the historical locations of the mobile computing device during each of the previously occurring "Bar Night" events on the user's "Personal" calendar. Upon determining that the user's mobile computing device was at a first location (e.g., "Location A") for the majority of the previously occurring "Bar Night" events on the "Personal" calendar, the suggested location engine 240 suggests the Location A as the location of the new "Bar Night" event.

However, when the user adds a similar new event to the "Work" calendar (e.g., an event with the user's coworkers also entitled "Bar Night"), the suggested location engine 240 determines the historical locations of the mobile device during each of the previously occurring "Bar Nights" events on the user's "Work" calendar. Upon determining that the user's mobile computing device was at a second location (e.g., "Location B") for the majority of the previously occurring "Bar Night" events on the "Work" calendar, the suggested location engine 240 suggests the Location B as the location of the new "Bar Night" event. Thus, the suggested location engine 240 can provide event-specific and calendar-specific suggestions. Although two separate calendars are described in the foregoing example, any number of calendars can be used in this manner (e.g., one, two, three, four, or more different calendars).

Figure 4A:
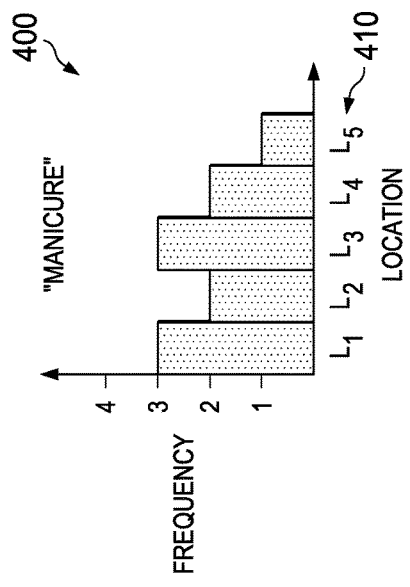
FIGS. 4A-4B are diagrams of example histograms used for suggesting locations.

In some cases, the suggested location engine 240 can maintain historical information regarding events in the form of a histogram. To illustrate, FIG. 4A shows an example histogram 400 associated with a "Manicure" event. Along the x-axis, the histogram 400 identifies five different locations 410, each representing a respective historical location of the user's mobile computing device during a previously occurring "Manicure" event. The frequency of each of the events is depicted along the y-axis. For instance, in this example, 11 "Manicure" events have occurred in the past. During three of those events, the user's mobile computing device was located at a location $L_1$. During two of those events, the user's mobile computing device was located at a location $L_2$. During three of those events, the user's mobile computing device was located at a location $L_3$. During two of those events, the user's mobile computing device was located at a location $L_4$. During one of those events, the user's mobile computing device was located at a location $L_5$. Thus, the histogram 400 describes the correlation between the text string "Manicure" and each of several locations.

Figure 4B:
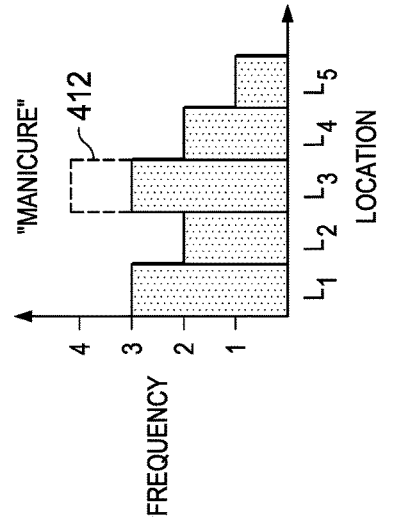

The histogram 400 is continuously updated to account for additional events. For example, as shown in FIG. 4B, during the occurrence of an additional "Manicure" event, a determination is made that the user's mobile computing device is located at the location $L_3$ (e.g., via the location determination engine 220 and/or the significant location engine 230). Accordingly, the histogram 400 is updated by incrementing the frequency of location $L_3$ by one (represented as the dotted rectangle 412). As such, the correlation between the text string "Manicure" and each of several locations is continuously updated based on the user's behavior.

Although histograms are visually depicted in FIGS. 4A-B, these are merely illustrative examples. In practice, histograms can be stored as text and/or using non-graphical data structures (e.g., a correlation table, an array, a matrix, a string, and so forth). Further, although the FIGS. 4A-B show histograms based only on event title, in some cases, different histograms can be maintained for each unique combination of event title, event description, anticipated participants or invitees, scheduled time or day, calendar, or a combination thereof.

Further, although different histograms can be used with respect to each calendar, this need not be the case. For instance, in some cases, a single consolidated histogram can be maintained for each particular event title, description, anticipated participants or invitees, scheduled time or day, or a combination thereof, regardless of the specific calendar being used.

Further, in some cases, separate histograms can be maintained with respect to each calendar, along with a consolidated histogram with respect to all of the calendars combined. This can be useful, for example, as it enables the suggested location engine 240 to first determine whether there are similar events with respect to a particular calendar. If so, the suggested location engine 240 can make suggestions based on the similar events with respect to that calendar. If not, the suggested location engine 240 can broadly make suggestions based on similar events with respect to all of the calendars. To illustrate, if a user adds a new event entitled "Staff Meeting" with respect to a "Management Team" calendar, the suggested location engine 240 can first determine whether there are any similar events on the "Management Team" calendar. If so, the suggested location engine 240 can access the histogram associated with the "Staff Meeting" event on the "Management Team" calendar, and determine a suggested location. If not, the suggested location engine 240 can access the histogram associated with all of the user's calendars (e.g., "Management Team," "Engineering Team," and "Sales Team"), and determine a suggested location based on previously occurring events from all of the calendars combined.

In some cases, the suggested location engine 240 can determine a suggested location using information other than that contained in histograms. For example, in some cases, the suggested location engine 240 can utilize a supervised learning model (e.g., a Support Vector Machine, or SVM) to determine a distinctive and/or exclusive location for a given string of text, and suggest that location to the user. For instance, the suggested location engine 240 can use information from previously occurring events as "training data" for the supervised learning model. This can include, for instance, information about the calendar item of each previously occurring event (e.g., the event title, event description, anticipated participants or invitees, scheduled time or day, calendar, or a combination thereof). This can also include information regarding the user's interaction with the calendar application with respect to each previously occurring event (e.g., the user's inputs confirming a suggested location for an event, deleting a suggested location for an event, modifying a suggested location for an event, and so forth). This can also include information regarding a user's behavior with respect to each previously occurring event (e.g., the user's location during an event, the user's travel habits with respect to an event, and so forth). Using this information, the suggested location engine 240 can determine "clusters" of factors or criteria corresponding to each particular location. Based on this clustering, the suggested location engine 240 can determine suggested locations for new events occurring in the future (e.g., by determining whether the event occurring in the future corresponds to a particular location "cluster," and suggesting that location as the suggested location).

In some cases, the suggested location engine 240 can suggest a location based on a classification or text mining approach. For instance, the suggested location engine can parse the textual information contained within a calendar item, identify one or more concepts described by the textual information, and suggest a relevant location based on that identification. As an example, the suggested location engine 240 can identify the term "shopping" in an event's title, and suggest a location related to "shopping" (e.g., a shopping mall). As another example, the suggested location engine 240 can identify the term "milk" in an event's description, and suggest a location related to "milk" (e.g., a grocery store).

In the foregoing examples, the suggested location engine 240 suggests a location based on an event's title, description, anticipated participants or invitees, scheduled time or day, or a combination thereof, without the user manually inputting any location information. However, this need not be the case. In some implementations, the suggested location engine 240 can also suggest locations based on location information manually inputted by the user. This can be useful, for example, if the user has entered location information that is too inexact or vague to positively identify a specific location on its own. For instance, the user can enter a colloquial name of a location (e.g., a personal nickname for the location, an abbreviated identifier associated with the location, or other information that informally identifies a location). As another example, the user can enter an incomplete address associated with the graphical location. On their own, these types of information typically would be insufficient to identify a specific location. However, the suggested location engine 240 can suggest a location based on the user's historical behavior with respect to previously occurring events having identical or otherwise similar location information.

As an example, a user can create a new event called "Game Night," and enter the text string "Jane's House" as the location. The text string "Jane's House," on its own, may be insufficient to positively identify a specific graphical location. However, the suggested location engine 240 can maintain a histogram with respect to the text string "Jane's House," and record the location of the user's mobile computing device during the occurrence of each event having the term "Jane's House" as the event's location. Based on this historical information, the suggested location engine 240 can suggest a specific location for future instances of the text string "Jane's House" as an event's location.

The suggested location engine 240 can update its suggested locations continuously, periodically, intermittently, and/or in response to a user's manual command. For example, in some cases, the suggested location engine 240 can continuously retrieve information regarding one or more events managed by the calendar application 210, and continuously update its suggested locations of each of the events. If any of the suggested locations change (e.g., due to a user's behavior with respect to recently occurring events), the suggested location engine 240 can automatically provide the calendar application 210 with new suggested locations as appropriate (e.g., to reflect a different suggested location). Similarly, the suggested location engine 240 can update its suggested locations periodically (e.g., hourly, daily, weekly, monthly, or according to some other period), intermittently, and/or in response to a user's manual command. Each of these new locations can be presented to the user via the calendar application 210.

In some cases, the suggested location engine 240 can update the suggested locations for multiple events at the same time. As an example, an event may be a part of a series of recurring events (e.g., a series of similar events occurring daily, weekly, monthly, yearly, or according to some other recurring schedule). The suggested location engine 240 can update some or all of the events in the series simultaneously or substantially simultaneously, such that the same suggested location is presented for each of those events.

In some cases, the suggested location engine 240 can automatically update its suggested locations for a particular event when the user retrieves information regarding that event. For example, as the user is browsing a calendar using the calendar application 210, the calendar application can automatically transmit, for each of the events that the user views, a request to the suggested location engine 240 for updated location suggestions. In response, the suggested location engine 240 determines whether any of the suggestions have changed (e.g., due to a user's behavior with respect to recent events), and if so, updates the location suggestions accordingly.

In some cases, the suggested location engine 240 can automatically update its suggested location for a particular event prior to the event's scheduled start time. For example, when an event is scheduled to begin less than a particular threshold amount of time in the future (e.g., 1 hour, 6 hours, 12 hours, 1 day, or some other threshold amount of time in the future), the calendar application can automatically transmit a request to the suggested location engine 240 for updated suggestions. In response, the suggested location engine 240 determines whether the location suggestion has changed (e.g., due to a user's behavior with respect to recent events), and if so, updates the location suggestion accordingly.

In some cases, the system 100 can also automatically provide navigation instructions to assist the user in traveling to the event's location. For example, the system 100 can determine a route beginning at the user's current location, and ending at the location of the event. If no location was specifically provided by the user, the system 100 can use the event's suggested location in determining the route.

In some cases, the system 100 can generate an alert to remind the user to begin traveling to the event's location, such that the user will arrive at the event on time. For example, the system 100 can periodically determine a route between a user's current location and the location of the event, and determine the length of time needed to complete the journey. When the event is sufficiently close in the future, the system 100 can generate an alert to remind the user to begin the journey. As an example, the system 100 might determine that the user requires 30 minutes to travel to the event's location. Thus, approximately 30 minutes prior to the beginning of the event (or some amount of time even earlier to provide the user with additional leeway in time), the system 100 can generate an alert reminding the user to begin traveling to the event's location. If no location was specifically provided by the user, the system 100 can use the event's suggested location in determining the route and generating a timely reminder.

In some cases, the system 100 can present a user with a suggested location that broadly identifies a geographical region. The user can review the suggested location, and if desired, select a specific location within the identified geographical region (e.g., a point of interest). This can be useful, for example, as it allows the user to manually specify a location to a greater degree of specificity, without requiring the user to manually input the entirety of the location information.

Figures 5A, 5B:
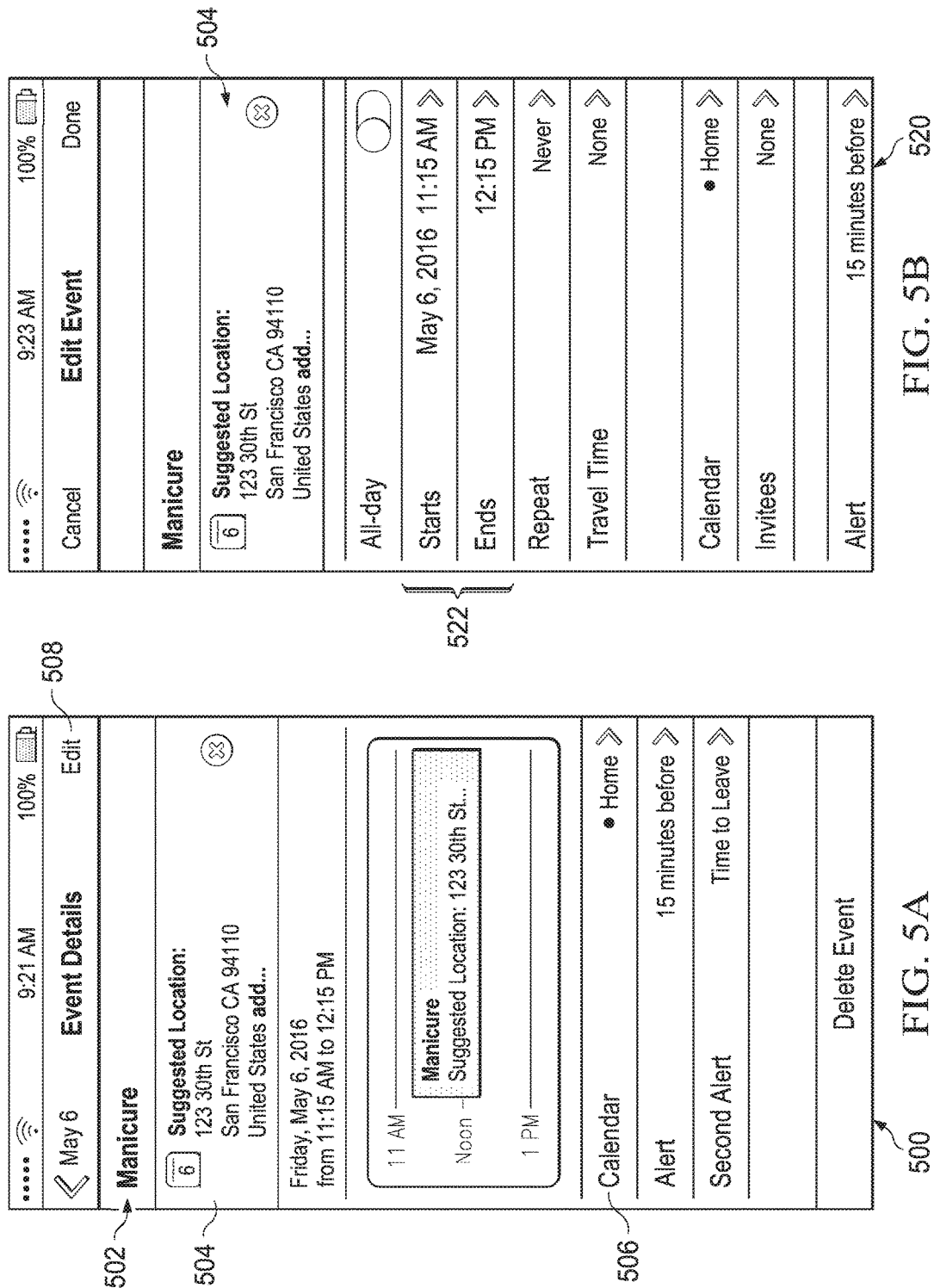
FIGS. 5A-5D are diagrams of example user interfaces for viewing and modifying suggested locations.

To illustrate, FIG. 5A shows as example user interface 500 for reviewing information regarding an event on an electronic calendar. In some cases, a user can access the user interface 500 by selecting an event displayed by the user interface 300 (e.g., by tapping the event 302 with a finger or stylus, or selecting the event 302 using a user interface device such as a keyboard or mouse). As shown in FIG. 5A, the user interface 500 includes information about the event, including a title 502 of the event, a location 504 of the event, and the calendar 506 associated with the event. In this example, the location 504 is a suggested location (e.g., as determined by the suggested location engine 240).

If the user wishes to modify information shown in the user interface 500, the user can select an "edit" option 508. As shown in FIG. 5B, in response, the user is presented with a user interface 520. The user can modify the information by selecting one or more of the options 522 (e.g., to change the day and time of the event, change the participants or invitees to the event, move the event to a different calendar, set or modify reminders and alerts for the event, and so forth).

Figure 5D:
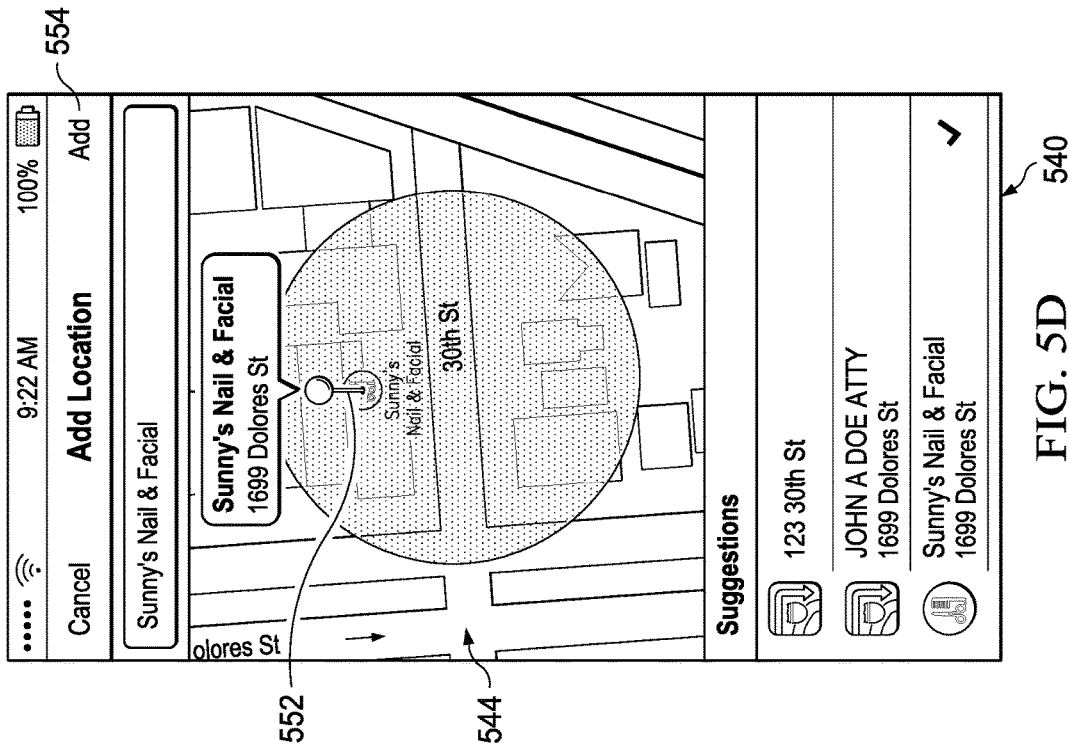
Figure 5C:
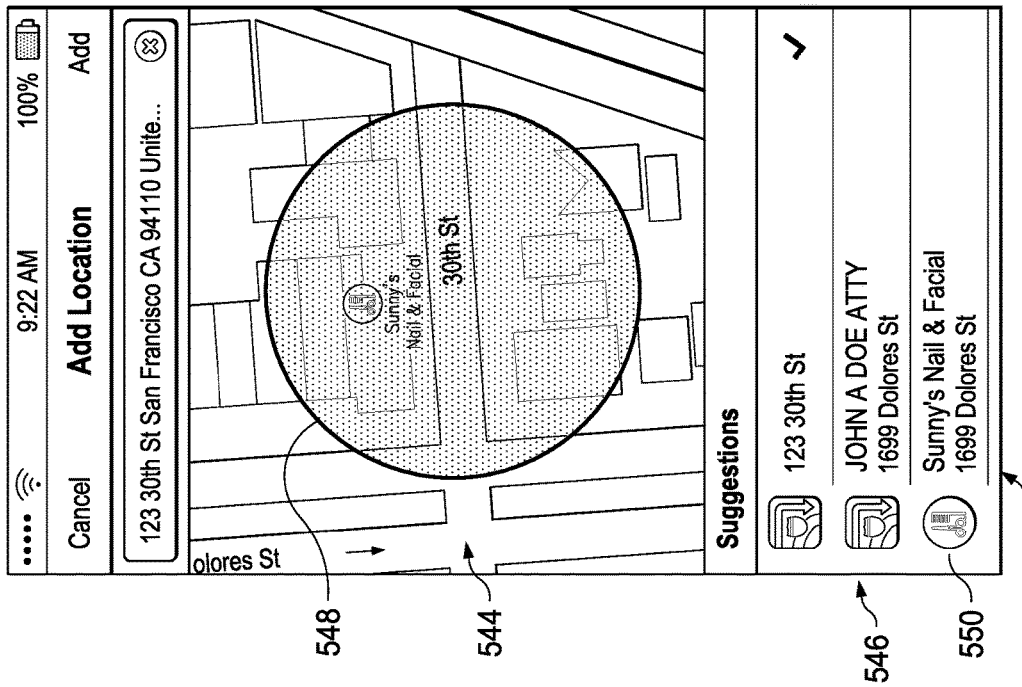

The user can also modify the suggested location by selecting the location 504 (e.g., by tapping on the suggested location using a finger or stylus). As shown in FIG. 5C, in response, the user is presented with a user interface 540. The user interface 540 includes a map 544, and a list of locations 546. The map 544 visually depicts the suggested location (indicated by the circle 548, overlaid on the map 544). In this example, the suggested location broadly identifies a geographical region rather than a specific geographical point.

In some cases, a geographical region can have particular pre-defined dimensions (e.g., a predefined radius about a central point, one or more predefined boundary lengths, and so forth). In some cases, a geographical region can have dynamically defined dimensions (e.g., enclosing a relatively small area for a region with densely distributed points of interest, or enclosing a relatively large area for a region with sparsely distributed points of interest).

To assist the user in narrowing the suggested location to a specific geographical point, the user interface 540 presents a list of locations 546. The list of locations 546 includes one or more specific geographical points within the geographical region. The user can browse the list of locations 546, and if desired, select one of the items on the list (e.g., the item 550). As shown in FIG. 5D, in response, the map 544 is updated to reflect the user's selection (e.g., by visually displaying the selected location on the map 544 as a "pin" 552). The user can confirm the location by selecting the option 554, thereby adding the selected location to the event. Thus, the user need not manually enter the entirety of the location information, and can instead select a specific location from a list of suggested locations.

The list of locations 546 can be determined in various ways. For example, in some cases, the suggested location engine 240 can determine a list of locations 546 within the suggested geographical region, and present some or all of the specific locations to the user. In some cases, the list of locations can be ordered alphabetically (e.g., based on a business name or residential listing associated with each location). In some cases, the list of locations can be ordered based on the distance of each specific location with respect to the center of the suggested geographical region (e.g., based on the distance from each specific location to the center of the suggested geographical region).

In some cases, the system 100 can suggest events in real-time based on a user's inputs. For example, a user can input a string of text identifying a new event into the calendar application 210. As the user inputs each character of the string, the calendar application 210 automatically displays one or more suggested events (e.g., one or more events having a similar title based on the entered string). If desired, the user can select one of the suggested events without inputting the full title of the event. This is useful, as it allows the user to add new events more quickly. This is also useful, as it allows the user to create new events having information consistent with previously occurring and/or previously entered events. Thus, the suggested location engine 240 can more consistently and accurately identify similar events when making suggestions.

Figure 6:
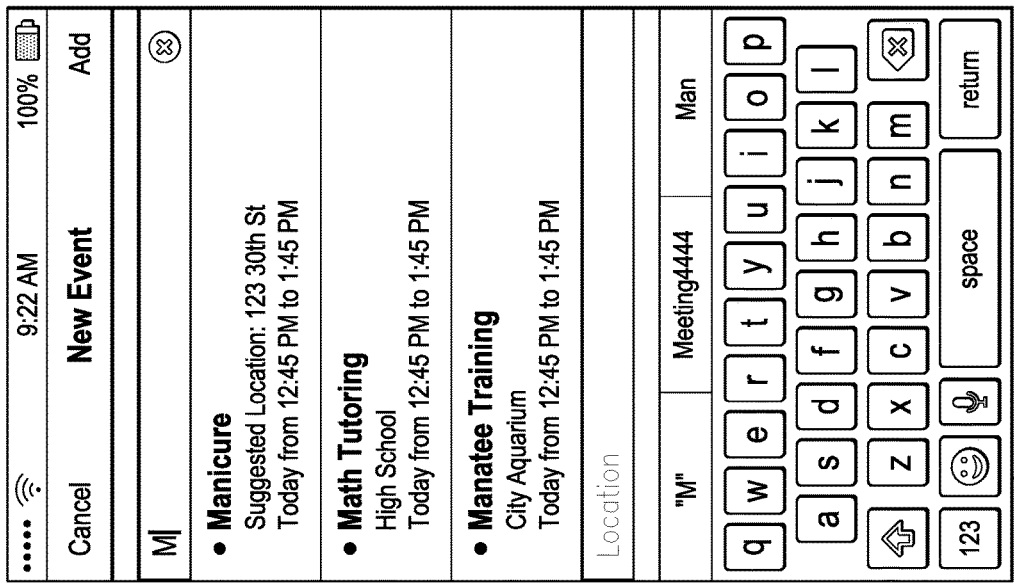
FIG. 6 is a diagram of an example user interface for entering information regarding new events.

As an illustrative example, FIG. 6 shows a user interface 600 that enables a user to enter information regarding new events. In this example, a user has entered the character "M." In response to the entry, the user interface 600 automatically displays several suggested events, each starting with the letter "M." Each of these suggestions corresponds to a previously occurring and/or previously entered event on the user's calendar. Each of these suggestions also includes information regarding an event, either previously entered by the user, or suggested by the suggested location engine 240. Accordingly, the user can select one of these suggestions to quickly and efficiently add the new event and its associated location information to the user's calendar.

In some cases, when the user selects a suggested location or confirms the accuracy of the suggested location, the system 100 can record the location as a "confirmed" location. In some cases, confirmed locations can be prioritized over other suggested locations. For example, if a user has confirmed that a particular location (e.g., "Location A") is associated with a particular event title (e.g., "Event Title A"), the suggested location engine 240 can present "Location A" as the suggested location for all other instances of "Event Title A." This can be useful, as it enables the system 100 to quickly and efficiently update suggested locations for multiple similar events, without requiring a user to manually modify each event individually. Further, it enables the system 100 to provide more accurate location suggestions for similar events in the future.

In some cases, the system 100 can suggest more than one location to the user (e.g., by displaying a list of suggested locations and/or multiple markers or "pins" on a visual map). These suggested locations can be determined, for instance, based on the frequency of occurrence of historical locations, the percentage of occurrence of historical locations relative to the total number of occurrences for similar events, confidence or likelihood scores, or a combination of one or more of these factors. As an example, the suggested location engine 240 can present the N most frequently occurring historical locations for similar events. As another example, the suggested location engine 240 can present the M most frequently occurring historical locations for similar events, where each of the M suggested locations exceeds 30% of the total number of occurrences for similar events.

In some cases, the system 100 can initially present a single suggested location to the user. If the user attempts to modify the location of the calendar event (e.g., by tapping on the location field with her finger or an input device, or "hovering" over the location field with an on-screen cursor), the suggested location engine 240 can present one or more alternative suggested locations from which the user can select. This can be useful, for example, as it enables the user to quickly and efficiently correct a suggested location for a calendar event. Further, as the user selects from previously occurring historical locations, the suggested location engine 240 is more likely to provide consistent and reliable suggested locations in the future. To illustrate, when a user manually inputs a location into a calendar event, she may not be consistent with her data entry (e.g., she may input the text strings "Adam's Home," "Adam's Place," "Adam's Apartment" for different calendar events, each referring to the same location). By presenting the user with previously occurring locations, the user is more likely to select previously inputted information. Thus, the historical records will be more consistent (e.g., only a single text string is used to describe each unique location), and resulting in more accurate suggested locations.

In some cases, the system 100 does not initially present a suggested location to the user at all. Instead, if the user attempts to input the location of the calendar event (e.g., by tapping on the location field with her finger or an input device, or "hovering" over the location field with an on-screen cursor), the suggested location engine 240 can present one or more suggested locations from which the user can select.

In some implementations, the system 100 enables users to share event information with one another. For example, the system 100 can maintain one or more calendars for each of several users, and enable users to exchange information regarding events (e.g., by distributing event information through calendar "invites"). In some cases, the system 100 can share information regarding a particular event's location only if the event's location was manually entered by a user, or if the event's location was a suggested location that was subsequently confirmed by the user. This can be useful, as it allows the system 100 to propagate event information to several users, while reducing the distribution of unconfirmed or suggested information (which may be inaccurate).

The implementations described herein can provide various technical benefits. As an example, implementations of the system 100 enable a user to input information regarding events more quickly and with fewer manual inputs. Thus, user's devices can remain in a lower power state for a longer period of time, thereby consuming fewer resources. To illustrate, a user can interact with a mobile computing device to enter information regarding an upcoming event. During data entry, the mobile computing device must remain in a relatively high power state (e.g., by powering up a touch-based display screen to display information to the user and/or receive inputs from the user). However, since locations are automatically suggested to the user, the user need not manually input a location for the event. Thus, the mobile computing device can revert back to a lower power state more quickly (e.g., by powering down its display screen). As a result, the mobile computing device can operate more efficiently.

As another example, implementations of the system 100 can automatically modify suggested locations for multiple events, without requiring a user to manually modify each individual event. As above, this enables the user's devices to remain in a lower power state for a longer period of time, thereby consuming fewer resources. To illustrate, based on a user's recent activities with respect to a number of events, the system 100 may determine that the certain suggested locations should be modified to better reflect the user's habits. In response, the appropriate suggested locations can be automatically updated without user intervention. As such, the user's mobile computing device need not remain in a relatively high power state to process user inputs (e.g., by powering up a touch-based display screen to display information to the user and/or receive inputs from the user), and can revert back to a lower power state more quickly (e.g., by powering down its display screen). As a result, the mobile computing device can operate more efficiently.

Example Processes

Figure 7:
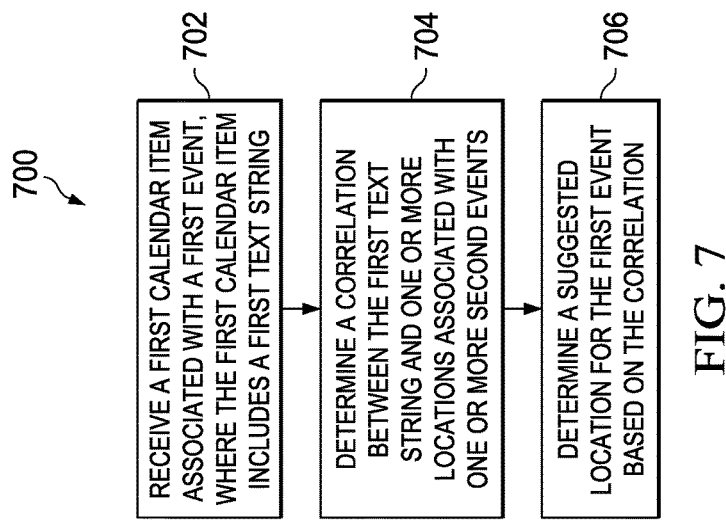
FIG. 7 is a flow diagram of another example process for managing data with respect to an electronic calendar.

FIG. 7 is a flow diagram of an example process 700 for managing data with respect to an electronic calendar. In some implementations, the process 700 can be implemented using, for example, the system 100 shown in FIG. 1, the architecture 200 shown in FIG. 2, and/or the device architecture 800 shown in FIG. 8.

In the process 700, a mobile device receives a first calendar item associated with a first event (step 702). The first calendar event includes a first text string. As described herein, the first text string includes information regarding the first event managed by an electronic calendar, such as the name of the first event, a location of the first event (e.g., an address, geographical coordinates such as latitude and longitude, or other such information), a scheduled time and day for the first event, a description of the first event (e.g., a narrative, an explanation, or other information pertaining to the event), the invitees or anticipated participants of the event, other information about the first event, or a combination thereof. In some cases, the text string can include a colloquial name of a location (e.g., a personal nickname for the location, an abbreviated identifier associated with the location, or other information that informally identifies a location).

The mobile device then determines a correlation between the first text string and one or more locations associated with one or more second events (step 704). As described herein, the one or more second events can be one or more previously occurring events managed by the electronic calendar having an identical or similar information as the first event. For example, each second event may have an identical or similar title, name, description, anticipated participants or invitees, or scheduled time or day as the first event, or a combination thereof.

The method device then determines a suggested location for the first event based on the correlation (step 706). As described herein, the suggested location for the first event can be automatically associated with the first calendar item, such that the user does not need to manually input a location for that event. In some cases, the suggested location can reflect a predicted or estimated location for the first event based on the user's historical behavior with respect to previously scheduled events. Thus, the suggested location can be a personalized location suggestion that more accurately reflect the habits and preferences of the user. In some cases, the mobile device can determine the correlation by receiving one or more second calendar items associated with the one or more second events, where the second calendar items each include the first text string. The mobile device determines one or more significant locations associated with the second events, and determines the correlation based on the second events and the significant locations. In some cases, this can include generating a histogram indicating a frequency in which the first text string is associated with each of the significant locations (e.g., as depicted and described with respect to FIGS. 4A and 4B).

In some cases, the mobile device can determine the suggested location by selecting the suggested location from among the significant locations. The suggested location can be a most frequently occurring significant location with respect to the first text string.

In some cases, the mobile device can also display, to a user of the mobile device, the suggested location, and receive an instruction from the user to modify the suggested location. In response to receiving the instruction to modify the suggested location, the mobile device can display, to the user, one or more points of interest near the suggested location. In some cases, the suggested location can be a geographical region (e.g., a broad area, rather than a specific point). The one or more points of interest can be located within the geographical region. In some cases, the mobile device can receive, from the user, an input from the user selecting one of the one or more points of interest. In response to receiving the input selecting one of the one or more points of interest, the mobile device can update the calendar item to include the selected point of interest. Examples of this functionality are depicted and described with respect to FIGS. 5A-D.

In some cases, the mobile device can display, to a user of the mobile device, the suggested location, and receive an input from the user confirming the suggested location. In response to receiving the input confirming the suggested location, the mobile device can add the suggested location to the first calendar item as a confirmed location for the first event.

In some cases, the mobile device can receive an instruction from a user to add the first calendar item. The instruction can include an entry of at least a portion of the first text string by the user. In response to receiving the instruction to add the first calendar item, the mobile device can automatically display the suggested location for the first event to the user.

Example Device Architecture

Figure 8:
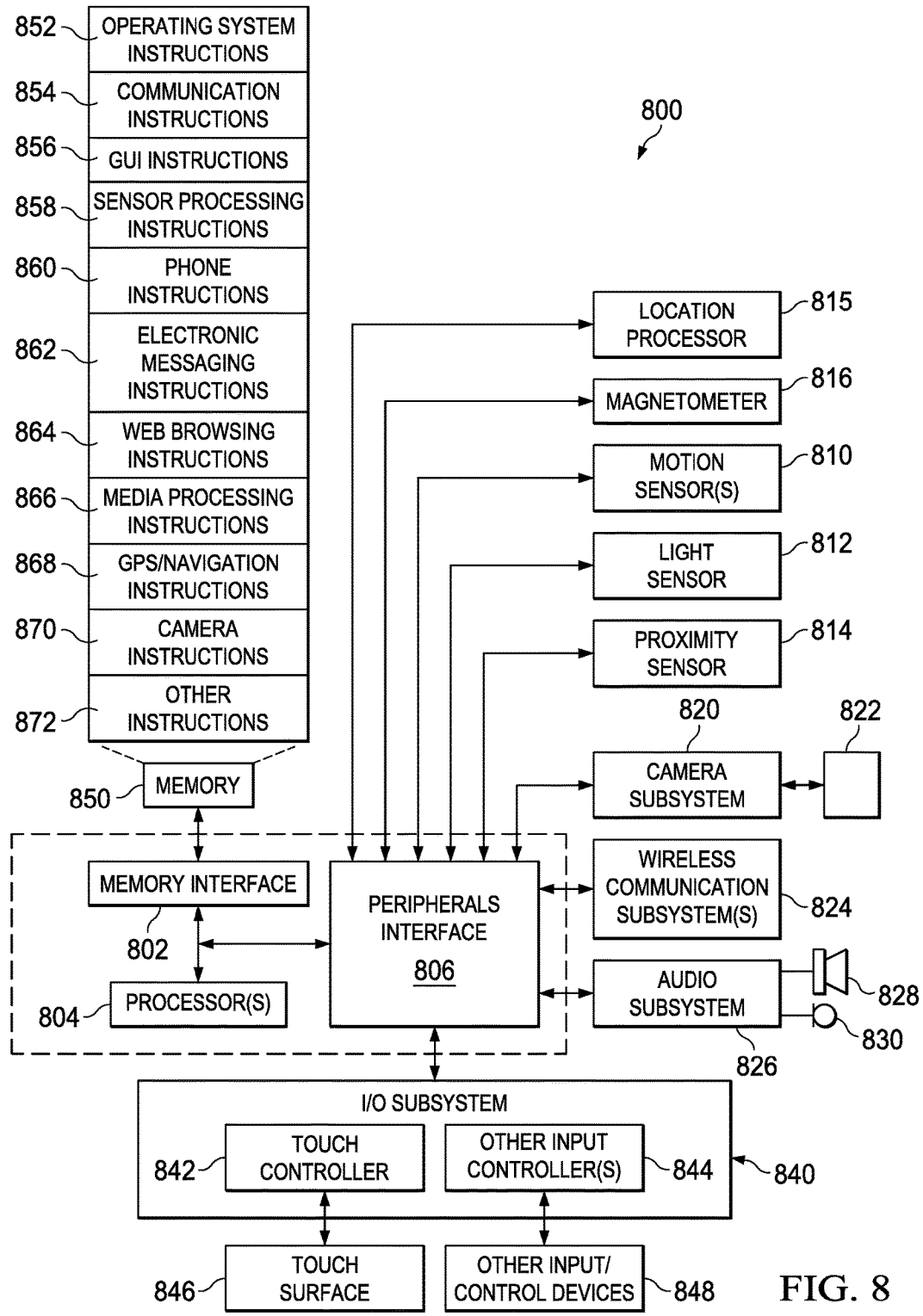
FIG. 8 is a block diagram of an example device architecture for implementing the features and processes described in reference to FIGS. 1-7.

FIG. 8 is a block diagram of an example device architecture 800 for implementing the features and processes described in reference to FIGS. 1-7. Device architecture 800 may be implemented in any mobile device for generating the features described in reference to FIGS. 1-7, including but not limited to desktop computers, portable computers, smart phones, tablet computers, game consoles, wearable computers, set top boxes, media players, smart TVs, and the like. Device architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functionalities. For example, motion sensor 810, light sensor 812, and proximity sensor 814 may be coupled to peripherals interface 806 to facilitate orientation, lighting, and proximity functions of the device. For example, in some implementations, light sensor 812 may be utilized to facilitate adjusting the brightness of touch surface 846. In some implementations, motion sensor 810 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 806, such as a temperature sensor, a biometric sensor, or other sensing device, to facilitate related functionalities.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used as an electronic compass.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 824 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 826 may be coupled to a speaker 828 and one or more microphones 830 to facilitate voice-enabled functions, such as voice recognition, voice replication, digital recording, and telephony functions.

I/O subsystem 840 may include touch controller 842 and/or other input controller(s) 844. Touch controller 842 may be coupled to a touch surface 846. Touch surface 846 and touch controller 842 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 may display virtual or soft buttons and a virtual keyboard, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

In some implementations, device architecture 800 may present recorded audio and/or video files, such as MP3, AAC, and MPEG video files. In some implementations, device architecture 800 may include the functionality of an MP3 player and may include a pin connector for tethering to other devices. Other input/output and control devices may be used.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications. Communication instructions 854 may also be used to select an operational mode or communication medium for use by the device, based on a geographic location (obtained by the GPS/Navigation instructions 868) of the device. Memory 850 may include graphical user interface instructions 856 to facilitate graphic user interface processing, including a touch model for interpreting touch inputs and gestures; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and functions; camera instructions 870 to facilitate camera-related processes and functions; and other instructions 872 for performing some or all of the processes, as described in reference to FIGS. 1-7.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a mobile device, a first calendar item associated with a first event, wherein the first calendar item comprises a first text string;
determining, at the mobile device, a correlation between the first text string and one or more locations associated with one or more second events, wherein determining the correlation comprises:
receiving, at the mobile device, one or more second calendar items associated with the one or more second events, wherein the one or more second calendar items each comprise the first text string,
determining, for each second calendar item, a respective location of the mobile device during the second event associated with the second calendar item,
determining a frequency in which the mobile device was located at each location during the one or more second events, and
selecting a suggested location for the first event, wherein the suggested location corresponds to a highest frequency location; and
associating, at the mobile device, the suggested location for the first event based on the correlation.

2. The method of claim 1, wherein the text string is a title of the first calendar item.

3. The method of claim 1, wherein the text string is a colloquial name of a location.

4. The method of claim 1, further comprising:
displaying, to a user of the mobile device, the suggested location;
receiving, at the mobile device, an instruction from the user to modify the suggested location; and
responsive to receiving the instruction to modify the suggested location, displaying, to the user, one or more points of interest near the suggested location.

5. The method of claim 4, wherein the suggested location is a geographical region; and
wherein the one or more points of interest are within the geographical region.

6. The method of claim 5, further comprising:
receiving, from the user, an input from the user selecting one of the one or more points of interest; and
responsive to receiving the input selecting one of the one or more points of interest, updating the first calendar item to include the selected point of interest.

7. The method of claim 1, further comprising:
displaying, to a user of the mobile device, the suggested location;
receiving, at the mobile device, an input from the user confirming the suggested location; and
responsive to receiving the input confirming the suggested location, adding the suggested location to the first calendar item as a confirmed location for the first event.

8. The method of claim 1, further comprising:
receiving, at the mobile device, an instruction from a user to add the first calendar item, wherein the instruction comprises entry of at least a portion of the first text string by the user;
responsive to receiving the instruction to add the first calendar item, automatically displaying the suggested location for the first event to the user.

9. The computer-implemented method of claim 1, further comprising:
synchronizing the first calendar item and the suggested location between the mobile device and one or more additional devices.

10. The computer-implemented method of claim 9, wherein synchronizing the first calendar item and the suggested location between the mobile device and one or more additional devices comprises modifying a copy of the first calendar item on the one or more additional devices to include the suggested location.

11. The computer-implemented method of claim 1, wherein the one or more second events are received at the first mobile device from one or more additional devices.

12. The computer-implemented method of claim 1, wherein determining the frequency in which the mobile device was located at each location includes generating a histogram indicating the frequency and the suggested location for the first event is selected from among the locations of the histogram, wherein the suggested location corresponds to a highest frequency location with respect to the histogram.

13. A non-transitory computer-readable medium including one or more sequences of instructions which, when executed by one or more processors, causes:
receiving, at a mobile device, a first calendar item associated with a first event, wherein the first calendar item comprises a first text string;
determining, at the mobile device, a correlation between the first text string and one or more locations associated with one or more second events, wherein determining the correlation comprises:
receiving, at the mobile device, one or more second calendar items associated with the one or more second events, wherein the one or more second calendar items each comprise the first text string,
determining, for each second calendar item, a respective location of the mobile device during the second event associated with the second calendar item,
determining a frequency in which the mobile device was located at each location during the one or more second events, and
selecting a suggested location for the first event, wherein the suggested location corresponds to a highest frequency location; and
associating, at the mobile device, the suggested location for the first event based on the correlation.

14. The computer-readable medium of claim 13, wherein the text string is a title of the first calendar item.

15. The computer-readable medium of claim 13, wherein the text string is a colloquial name of a location.

16. The computer-readable medium of claim 13, wherein the one or more sequences of instructions, when executed by one or more processors, causes:
displaying, to a user of the mobile device, the suggested location;
receiving, at the mobile device, an instruction from the user to modify the suggested location; and
responsive to receiving the instruction to modify the suggested location, displaying, to the user, one or more points of interest near the suggested location.

17. The computer-readable medium of claim 16, wherein the suggested location is a geographical region; and
wherein the one or more points of interest are within the geographical region.

18. The computer-readable medium of claim 17, wherein the one or more sequences of instructions, when executed by one or more processors, causes:
receiving, from the user, an input from the user selecting one of the one or more points of interest; and responsive to receiving the input selecting one of the one or more points of interest, updating the first calendar item to include the selected point of interest.

19. The computer-readable medium of claim 13, wherein the one or more sequences of instructions, when executed by one or more processors, causes:
    displaying, to a user of the mobile device, the suggested location;
    receiving, at the mobile device, an input from the user confirming the suggested location; and
    responsive to receiving the input confirming the suggested location, adding the suggested location to the first calendar item as a confirmed location for the first event.

20. The computer-readable medium of claim 13, wherein the one or more sequences of instructions, when executed by one or more processors, causes:
    receiving, at the mobile device, an instruction from a user to add the first calendar item, wherein the instruction comprises entry of at least a portion of the first text string by the user;
    responsive to receiving the instruction to add the first calendar item, automatically displaying the suggested location for the first event to the user.

21. The non-transitory computer-readable medium of claim 13, wherein determining the frequency in which the mobile device was located at each location includes generating a histogram indicating the frequency and the suggested location for the first event is selected from among the locations of the histogram, wherein the suggested location corresponds to a highest frequency location with respect to the histogram.

22. A system comprising: one or more processors; a non-transitory computer-readable medium including one or more sequences of instructions which, when executed by the one or more processors, causes:
    receiving, at a mobile device, a first calendar item associated with a first event, wherein the first calendar item comprises a first text string;
    determining, at the mobile device, a correlation between the first text string and one or more locations associated with one or more second events, wherein determining the correlation comprises:
      receiving, at the mobile device, one or more second calendar items associated with the one or more second events, wherein the one or more second calendar items each comprise the first text string,
      determining, for each second calendar item, a respective location of the mobile device during the second event associated with the second calendar item,
      determining a frequency in which the mobile device was located at each location during the one or more second events, and
      selecting a suggested location for the first event, wherein the suggested location corresponds to a highest frequency location; and
    associating, at the mobile device, the suggested location for the first event based on the correlation.

23. The system of claim 22, wherein the text string is a title of the first calendar item.

24. The system of claim 22, wherein the text string is a colloquial name of a location.

25. The system of claim 22, wherein the one or more sequences of instructions, when executed by one or more processors, causes:
    displaying, to a user of the mobile device, the suggested location;
    receiving, at the mobile device, an instruction from the user to modify the suggested location; and
    responsive to receiving the instruction to modify the suggested location, displaying, to the user, one or more points of interest near the suggested location.

26. The system of claim 25, wherein the suggested location is a geographical region; and
    wherein the one or more points of interest are within the geographical region.

27. The system of claim 26, wherein the one or more sequences of instructions, when executed by one or more processors, causes:
    receiving, from the user, an input from the user selecting one of the one or more points of interest; and
    responsive to receiving the input selecting one of the one or more points of interest, updating the first calendar item to include the selected point of interest.

28. The system of claim 22, wherein the one or more sequences of instructions, when executed by one or more processors, causes:
    displaying, to a user of the mobile device, the suggested location;
    receiving, at the mobile device, an input from the user confirming the suggested location; and
    responsive to receiving the input confirming the suggested location, adding the suggested location to the first calendar item as a confirmed location for the first event.

29. The system of claim 22, wherein the one or more sequences of instructions, when executed by one or more processors, causes:
    receiving, at the mobile device, an instruction from a user to add the first calendar item, wherein the instruction comprises entry of at least a portion of the first text string by the user;
    responsive to receiving the instruction to add the first calendar item, automatically displaying the suggested location for the first event to the user.

30. The system of claim 22, wherein determining the frequency in which the mobile device was located at each location includes generating a histogram indicating the frequency and the suggested location for the first event is selected from among the locations of the histogram, wherein the suggested location corresponds to a highest frequency location with respect to the histogram.

* * * * *